United States Patent
Miyake et al.

(10) Patent No.: US 9,108,799 B2
(45) Date of Patent: Aug. 18, 2015

(54) CONVEYOR CHAIN

(71) Applicants: Daifuku Co., Ltd., Osaka-shi, Osaka (JP); Oriental Chain Mfg. Co., Ltd., Ishikawa (JP)

(72) Inventors: Masahiro Miyake, Shiga (JP); Hidefumi Nagatomo, Shiga (JP); Kenichi Nishizaka, Ishikawa (JP)

(73) Assignees: DAIFUKU CO., LTD. (JP); ORIENTAL CHAIN MFG. CO., LTD. (JP)

( * ) Notice: Subject to any disclaimer, the term of this patent is extended or adjusted under 35 U.S.C. 154(b) by 0 days.

(21) Appl. No.: 14/269,607

(22) Filed: May 5, 2014

(65) Prior Publication Data

US 2014/0332353 A1 Nov. 13, 2014

(30) Foreign Application Priority Data

May 10, 2013 (JP) ................................. 2013-100729

(51) Int. Cl.
  B65G 17/06 (2006.01)
  B65G 17/44 (2006.01)
  B65G 17/32 (2006.01)

(52) U.S. Cl.
  CPC .............. B65G 17/065 (2013.01); B65G 17/32 (2013.01); B65G 17/44 (2013.01)

(58) Field of Classification Search
  CPC ...... B65G 17/065; B65G 17/08; B65G 17/32; B65G 17/34; B65G 17/44
  USPC ......................................... 198/850, 851, 853
  See application file for complete search history.

(56) References Cited

U.S. PATENT DOCUMENTS

| 2,584,134 A | * | 2/1952 | Knutson ........................ 160/220 |
| 2,743,003 A | * | 4/1956 | Allen ............................. 198/851 |
| 3,285,395 A | * | 11/1966 | Resener ........................ 198/851 |
| 3,842,968 A | * | 10/1974 | Owens ........................... 198/851 |
| 3,857,478 A | * | 12/1974 | Meeusen .................... 198/690.2 |
| 3,944,059 A | * | 3/1976 | Garvey ......................... 198/850 |
| 4,096,943 A | * | 6/1978 | Gentsch ........................ 198/793 |
| 4,597,492 A | * | 7/1986 | Lachonius et al. ............ 198/852 |
| 4,742,854 A | * | 5/1988 | Forslund .................. 144/250.17 |
| 4,765,455 A | * | 8/1988 | Matsuno et al. .............. 198/779 |
| 4,997,017 A | * | 3/1991 | Dobbie ......................... 144/128 |
| 5,402,880 A | * | 4/1995 | Murphy ........................ 198/852 |

(Continued)

FOREIGN PATENT DOCUMENTS

JP H06-11941 Y2 3/1994

*Primary Examiner* — Leslie A Nicholson, III
*Assistant Examiner* — Keith R Campbell
(74) *Attorney, Agent, or Firm* — Cantor Colburn LLP

(57) ABSTRACT

The purpose of the present invention is to provide a conveyor chain conveying a conveyance object such as a bucket while the conveyance object is mounted thereon, wherein the conveyance object can be conveyed to a predetermined position while both the conveyance object and the receiving member are not damaged by "biting" or "hooking" at upstream or downstream end in a conveying direction. An upstream tapered surface and a downstream tapered surface, which reduce the thickness of the receiving member gradually along the extended direction, are formed respectively at sides in the extended direction of a mounting surface of the receiving member. A locus of the mounting surface in a case in which the conveyor chain is meshed with and wound onto a sprocket is within a circle which is coaxial to the sprocket and whose tangent is a straight locus of the mounting surface in a case of conveying a bucket (conveyance object).

3 Claims, 13 Drawing Sheets

(56) References Cited

U.S. PATENT DOCUMENTS

| | | | |
|---|---|---|---|
| 6,662,545 B1 * | 12/2003 | Yoshida | 59/78 |
| 6,707,014 B1 * | 3/2004 | Corey et al. | 219/494 |
| 7,225,918 B2 * | 6/2007 | Freudelsperger | 198/853 |
| 7,546,726 B1 * | 6/2009 | Wu | 59/78 |
| 2006/0096243 A1 * | 5/2006 | Weaver | 53/249 |

* cited by examiner

Fig.3
(a)
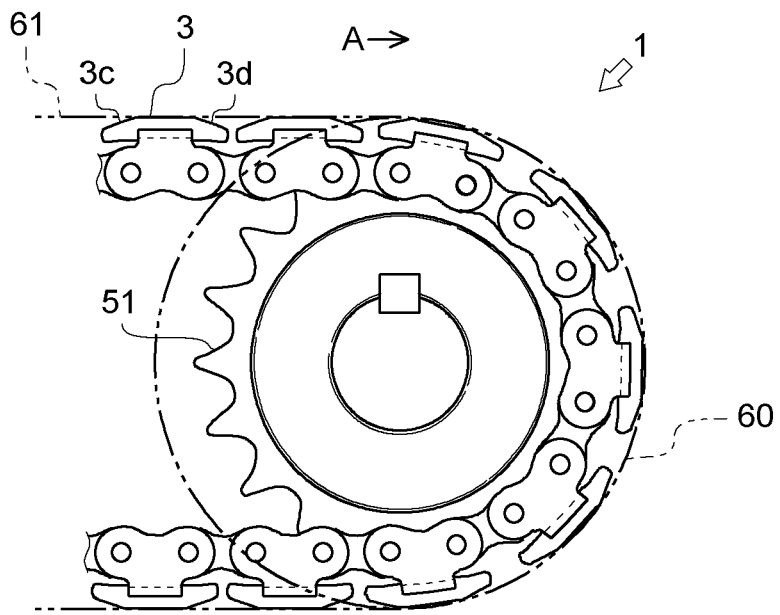
(b)
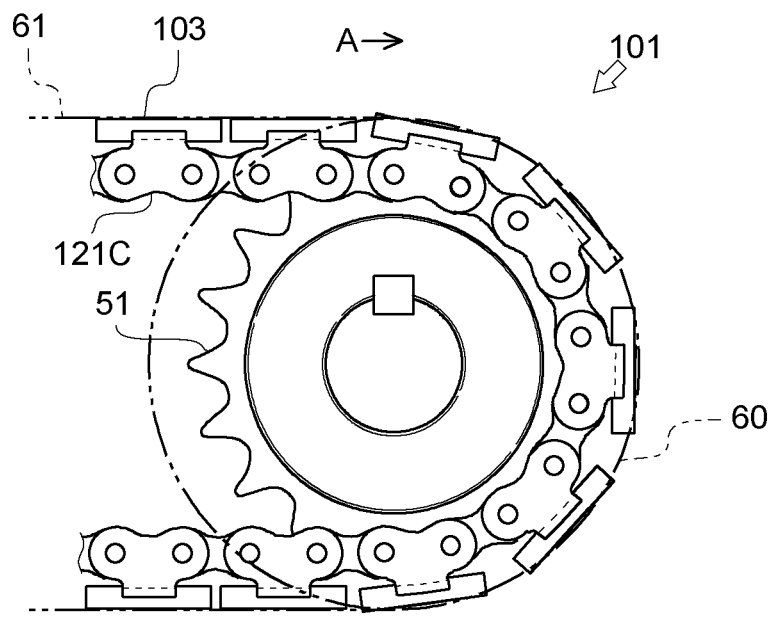

Fig.6
(a)
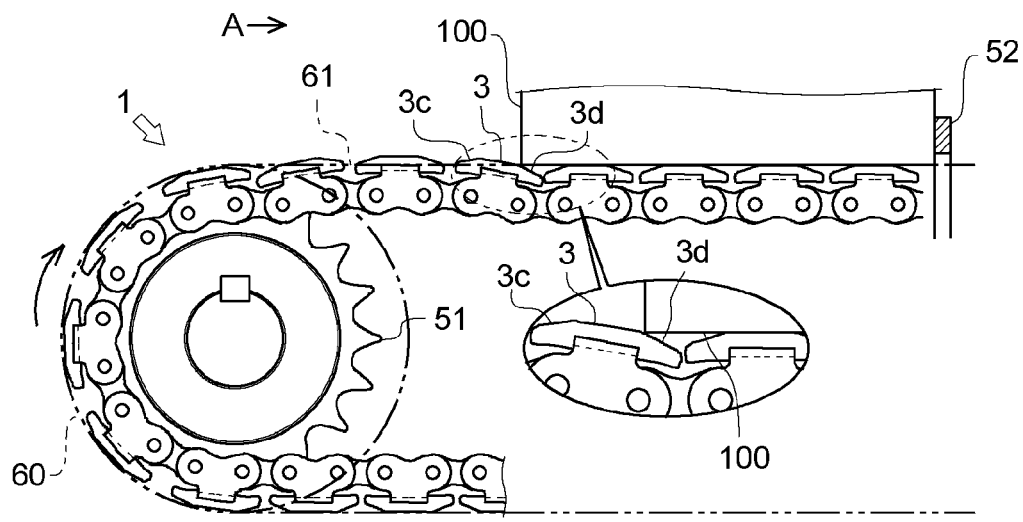
(b)
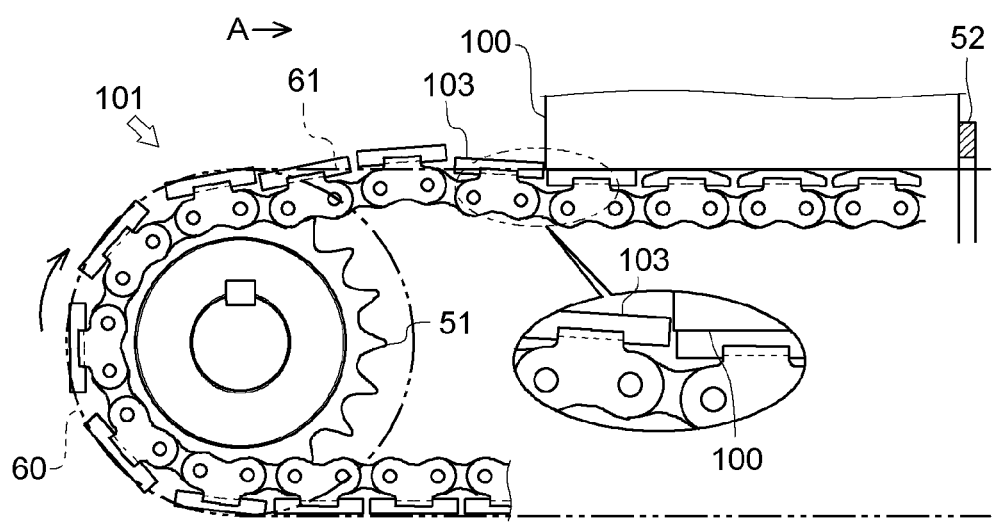

Fig.13
(a)
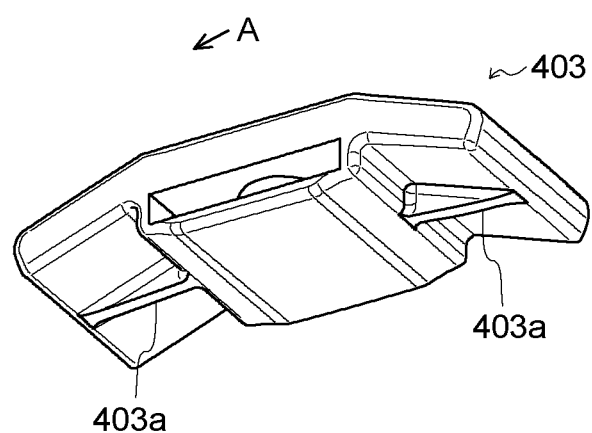
(b)
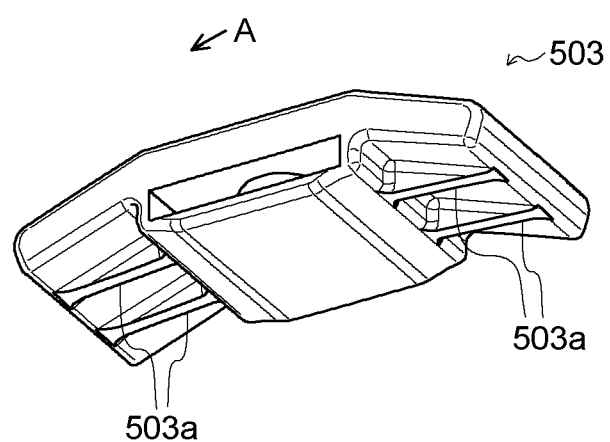

CONVEYOR CHAIN

CROSS REFERENCE TO RELATED APPLICATIONS

The present invention claims priority under 35 U.S.C. §119 to Japanese Application No. 2013-100729 filed May 10, 2013, the entire content of which is incorporated herein by reference.

TECHNICAL FIELD

The present invention relates to an art of a conveyor chain conveying a conveyance object to a predetermined position while the conveyance object is mounted on the conveyor chain.

BACKGROUND ART

An endless conveyor chain is known as one of means for conveying parts or finished products to a predetermined position in a production line of a factory for example.

One or more of the conveyor chains are provided, and extended horizontally and disposed in parallel to each other for example.

The plurality of the parts or finished products are mounted directly on the conveyor chain or are collected to one bucket and then mounted on the conveyor chain via the bucket, and are conveyed to the predetermined position.

Conventionally, in each of the conveyor chains provided in a conveyance device, for extending service life of the bucket which is the conveyance object, a plurality of receiving members made by resin or rubber are disposed for e predetermined pitch (for example, see the "Patent Literature 1").

Namely, the bucket is not mounted directly on metal parts of the conveyor chain but mounted on the receiving members made by resin or rubber. Accordingly, sudden scratch or damage in a bottom surface of the bucket can be prevented, thereby service life of the bucket can be extended.

PRIOR ART REFERENCE

Patent Literature

Patent Literature 1: the Japanese Utility Model Hei. 6-11941 A

DISCLOSURE OF INVENTION

Problems to be Solved by the Invention

However, as shown in the "Patent Literature 1", the receiving member provided in the conventional conveyor chain is formed substantially rectangular and draws a polygonal locus in the case of passing through the sprocket.

As a result, a failure of causing biting or hooking of the bottom surface of the bucket with the receiving member at upstream or downstream end in a conveying direction of the conveyor chain may occur.

The present invention is provided in consideration of the conditions as mentioned above, and the purpose of the invention is to provide a conveyor chain conveying a conveyance object such as a bucket while the conveyance object is mounted thereon, wherein the conveyance object can be conveyed to a predetermined position while both the conveyance object and the receiving member are not damaged by "biting" or "hooking" at upstream or downstream end in a conveying direction.

Means for Solving the Problems

The problems to be solved by the present invention have been described above, and subsequently, the means of solving the problems will be described below.

A conveyor chain according to the present invention which conveys a conveyance object by power transmitted via a sprocket meshed with the conveyor chain, includes a first link plate extended along a conveying direction, a second link plate extended along the conveying direction and facing the first link plate in a direction perpendicular to the conveying direction, and a receiving member which is formed substantially rectangular, whose extended direction is in agreement with the conveying direction, and whose thickness direction is perpendicular to the facing direction of the first link plate and the second link plate. A tongue piece, which is extended perpendicular to the second link plate and toward the first link plate, is provided at one of edges in a direction perpendicular to the extended direction of the second link plate. The receiving member is formed integrally with and fixed to the second link plate via the tongue piece. The conveyance object is conveyed while being mounted on the receiving member. The conveyor chain is characterized in that a tapered surface, which reduces the thickness of the receiving member gradually along the extended direction, is formed at each of sides in the extended direction of a mounting surface of the receiving member, and a tangent of a locus of the mounting surface in a case in which the conveyor chain is meshed with and wound onto the sprocket is a straight locus of the mounting surface in a case of conveying the conveyance object.

In the above configuration, preferably, the tongue piece is fit at a middle portion in the thickness direction of the receiving member, a notched hole is formed at a central portion of the tongue piece, and inside the receiving member, thick parts at both sides in the thickness direction of the receiving member are connected to each other by a solid part with which an inside of the notched hole is filled.

In the above configuration, preferably, a rectangular recess is formed at each of edges in a direction perpendicular to the extended direction of the tongue piece, and inside the receiving member, the thick parts at both sides in the thickness direction of the receiving member are connected to each other by a solid part with which an inside of the recess is filled.

Effect of the Invention

The present invention brings the following effects.

According to the conveyor chain of claim 1, the conveyance object can be conveyed to a predetermined position while both the conveyance object and the receiving member are not damaged by "biting" or "hooking" at upstream or downstream end in the conveying direction.

According to the conveyor chain of claim 2, for example, even if sudden compression load or tension load is applied on the receiving member along extended direction or thickness direction of the tongue piece, the receiving member is not removed from the tongue piece and is not turned over.

According to the conveyor chain of claim 3, for example, even if sudden compression load or tension load is applied on the receiving member along the extended direction of the tongue piece, the receiving member is not removed from the tongue piece.

BRIEF DESCRIPTION OF DRAWINGS

FIG. 1(a) is a plan view, and FIG. 1(b) is a side view.

FIG. 3 is a drawing of a state of the conveyor chain wound around a sprocket. FIG. 3(a) is a side view of the state of the conveyor chain according to the first embodiment, and FIG. 3(b) is a side view of the state of the conveyor chain according to the conventional mode.

FIG. 4(a) is a side view of the state of the transfer part including the conveyor chains according to the first embodiment, and FIG. 4(b) is a side view of the state of the transfer part including the conveyor chains according to the conventional mode.

FIG. 5(a) is a side view of the state of the transfer part including the conveyor chains according to the first embodiment, and FIG. 5(b) is a side view of the state of the transfer part including the conveyor chains according to the conventional mode.

FIG. 6 is a drawing of a state just after the conveyance object is stopped by a stopper on a middle portion of the conveyor chain. FIG. 6(a) is a side view of the state of the conveyor chain according to the first embodiment, and FIG. 6(b) is a side view of the state of the conveyor chain according to the conventional mode.

FIG. 7(a) is a plan view, and FIG. 7(b) is a side view.

FIG. 9(a) is a lower perspective view, and FIG. 9(b) is a lower perspective view divided by a perpendicular plane at a longitudinal center of the chain link.

FIG. 10(a) is a plan view, and FIG. 10(b) is a side view.

FIG. 12(a) is a lower perspective view, and FIG. 12(b) is a lower perspective view divided by a perpendicular plane at a longitudinal center of the chain link.

FIG. 13 is a drawing of a shape of another receiving member. FIG. 13(a) is a lower perspective view of a shape of a receiving member provided in a conveyor chain according to the fourth embodiment, FIG. 13(b) is a lower perspective view of a shape of a receiving member provided in a conveyor chain according to the fifth embodiment.

DETAILED DESCRIPTION OF THE INVENTION

Next, an explanation will be given on embodiments of the present invention.

[Conveyor Chain 1 (First Embodiment)]

Firstly, an explanation will be given on a conveyor chain 1 according to a first embodiment which realizes the present invention referring to FIGS. 1 to 6.

In below explanation, for convenience, a vertical direction of each of FIG. 1(b) and FIGS. 2 to 6 is specified as a vertical direction of the conveyor chain 1.

A direction of an arrow A in each of FIG. 1 and FIGS. 3 to 6 is specified as a conveying direction.

The conveyor chain 1 in this embodiment is provided as a means conveying a bucket 100 in which a plurality of parts and finished products are housed (for example, see FIG. 4) to a predetermined position in a production line of a factory for example, and power for conveying the bucket 100 is transmitted via a sprocket 51 meshed with the conveyor chain 1 (for example, see FIG. 3).

Figure 1:
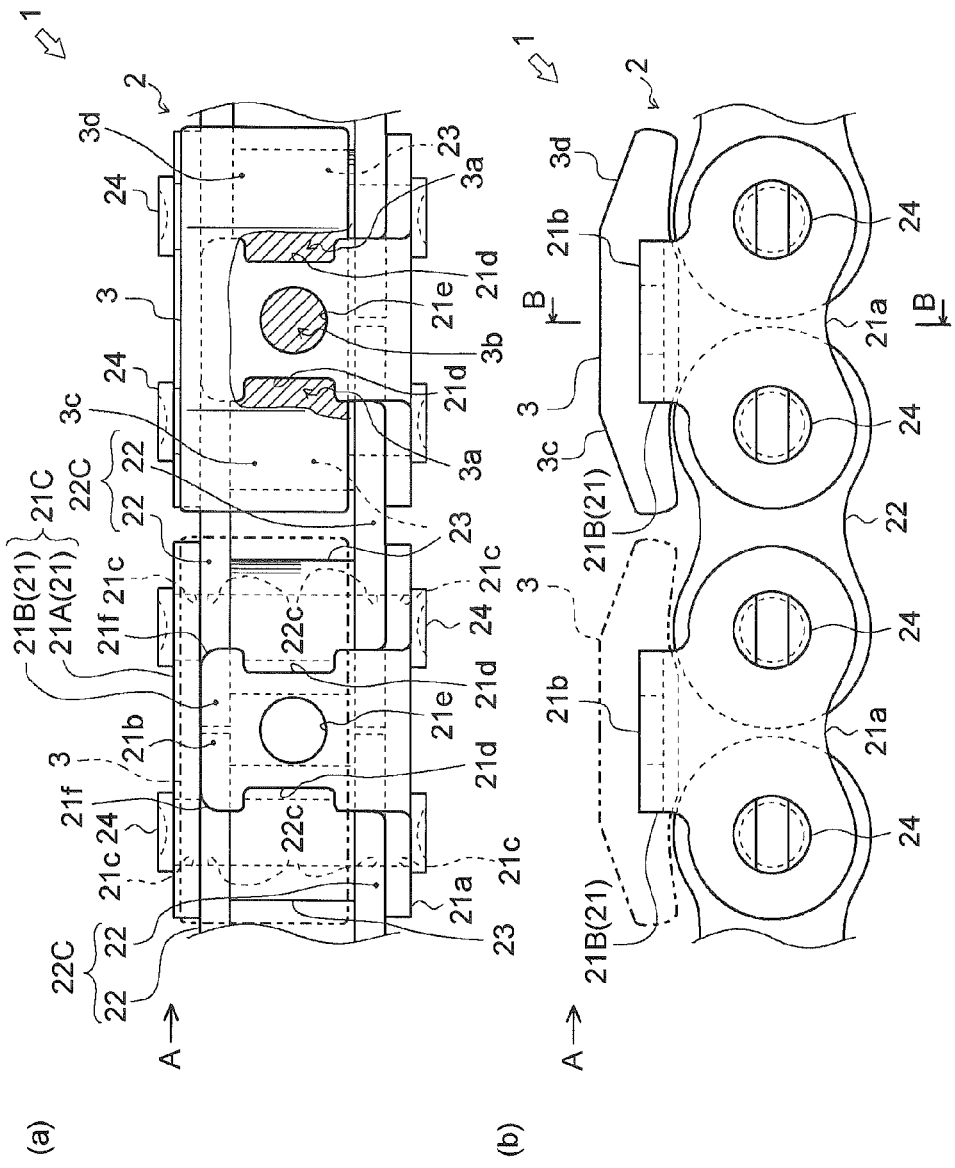
FIG. 1 is a drawing of entire configuration of a conveyor chain according to a first embodiment of the present invention.

As shown in FIG. 1, the conveyor chain 1 mainly includes a chain body 2 and a plurality of receiving members 3.

The chain body 2 is a main body of the conveyor chain 1.

As shown in FIG. 1(a), the chain body 2 includes a plurality of outside link plates 21, a plurality of inside link plates 22, a plurality of chain rollers 23, a plurality of roller pins 24 and the like.

Similarly to the inside link plates 22 discussed later, the outside link plates 21 constitute a mainstay of the chain body 2.

Each of the outside link plates 21 includes a first outside link plate (first link plate) 21A or a second outside link plate (second link plate) 21B.

The first outside link plate 21A includes a plate member which has a substantially rectangular shape with round corners and is extended along the conveying direction (the direction of the arrow A; the same shall apply hereinafter), and for example in this embodiment, the first outside link plate 21A is extended horizontally and is in parallel to a vertical plane.

On the other hand, the second outside link plate 21B includes a base 21a and a tongue piece 21b.

The base 21a is extended along the conveying direction and shaped substantially the same as the first outside link plate 21A. The tongue piece 21b is shaped substantially rectangular and extended perpendicularly to the base 21a and toward the first outside link plate 21A at an edge at one of sides of a direction perpendicular to the extended direction of the base 21a (in this embodiment, an upper edge).

As discussed later, the receiving member 3 is fixed to the second outside link plate 21B via the tongue piece 21b.

The second outside link plate 21B is disposed so that the base 21a faces the first outside link plate 21A in a direction perpendicular to the conveying direction (that is, the horizontal direction) and the tongue piece 21b is extended toward the first outside link plate 21A.

Accordingly, the first outside link plate 21A and the second outside link plate 21B, which are disposed oppositely to each other, constitute the pair of the outside link plates 21 (hereinafter, referred to as "outside link assembly 21C" as needed).

Similarly to the outside link plates 21, the inside link plates 22 constitute the mainstay of the chain body 2.

As shown in FIG. 1(b), each of the inside link plates 22 includes a plate member which has a substantially rectangular shape with round corners and is extended along the conveying direction, and for example in this embodiment, the inside link plate 22 is extended horizontally and is in parallel to the vertical plane.

As shown in FIG. 1(a), the two inside link plates 22 are disposed oppositely to each other in the direction perpendicular to the conveying direction (that is, the horizontal direction), whereby the pair of the inside link plates 22 (hereinafter, referred to as "inside link assembly 22C" as needed) is configured.

The chain rollers 23 touch directly the sprocket 51 when the chain body 2 is wound onto the sprocket 51 for example.

The chain rollers 23 include hollow cylindrical members.

As shown in FIG. 1(*a*), the two chain rollers 23 are disposed inside the inside link assembly 22C and at both ends in the extended direction (conveying direction) of the inside link assembly 22C while the axes of the chain rollers 23 are directed oppositely to the two inside link plates 22, and are pivotally supported by the roller pins 24 discussed later.

The roller pins 24 chains the outside link assembly 21C and the inside link assembly 22C so as to be bendable, and support pivotally the chain rollers 23.

Each of the roller pins 24 includes a round bar member, and grooves for caulking are provided at both ends thereof.

At both ends in the extended direction of the outside link assembly 21C, two through-holes 21*c* are provided which penetrate simultaneously the first outside link plate 21A and the second outside link plate 21B constituting the outside link assembly 21C.

At both ends in the extended direction of the inside link assembly 22C, two through-holes 22*c* are provided which penetrate simultaneously the two inside link plates 22 constituting the inside link assembly 22C.

One of ends in the extended direction, that is, the conveying direction (for example, an upstream end) of the outside link assembly 21C and the other end in the extended direction, that is, the conveying direction (for example, a downstream end) of the inside link assembly 22C are placed so as to overlap each other.

The other end in the conveying direction (for example, a downstream end) of the outside link assembly 21C and one of the ends in the conveying direction (for example, an upstream end) of the inside link assembly 22C are placed so as to overlap each other.

Furthermore, the chain rollers 23 are placed so as to overlap each other at both the ends of in the conveying direction of the inside link assembly 22C.

In this state, the through-holes 21*c* of the outside link assembly 21C, the through-holes 22*c* of the inside link assembly 22C, and the chain rollers 23 are arranged coaxially.

Then, the roller pins 24 are provided penetratingly to inner perimeters of the through-holes 21*c*, the through-holes 22*c* and the chain rollers 23.

Accordingly, the plurality of the outside link assemblies 21C and the plurality of the inside link assemblies 22C are disposed alternately, and chained by the plurality of the roller pins 24 so as to be bendable.

In this case, at both the ends in the conveying direction of each of the inside link assemblies 22C, the plurality of chain rollers 23 are supported pivotally by the roller pins 24 so as to be rotatable.

For example, it may alternatively be configured that the outside link assembly 21C only includes the second outside link plate 21B and the adjacent two inside link assemblies 22C are chained via the second outside link plate 21B.

Next, an explanation will be given on the receiving members 3.

Each of the receiving members 3 is a member on which the bucket 100 is mounted when the bucket 100 is conveyed by the conveyor chain 1.

The receiving member 3 includes a substantially rectangular plate member formed by thermoplastic resin or an elastic member such as rubber, for example.

Then, the receiving member 3 is disposed so that an extended direction of the receiving member 3 is in agreement with the conveying direction and a thickness direction of the receiving member 3 is perpendicular to a facing direction of the first outside link plate 21A and the second outside link plate 21B.

Namely, the receiving member 3 is disposed in an upper portion of the outside link assembly 21C so that a lengthwise direction of the receiving member 3 is in agreement with the conveying direction and an upper surface of the receiving member 3 is horizontal.

At a middle portion in the lengthwise direction of the receiving member 3, the tongue piece 21*b* is fitted.

When viewed in plan, at one of sides of the receiving member 3 in a direction perpendicular to the conveying direction (more concretely, a side of the receiving member 3 at a side of the second outside link plate 21B), the tongue piece 21*b* of the second outside link plate 21B is fitted.

In other words, with a sandwich structure covering upper and lower surfaces of the tongue piece 21*b* by thickness of the receiving member 3, the receiving member 3 is formed integrally with the tongue piece 21*b* and fixed strongly to the tongue piece 21*b*.

As shown in FIG. 1(*b*), the receiving member 3 has enough thickness at a portion fitting the tongue piece 21*b*, and has two curved surfaces 3*e*, which are curved toward the conveying direction, in a lower surface at upstream and downstream sides in the conveying direction.

Therefore, in the receiving member 3 of this embodiment, the lower surface at upstream and downstream sides in the conveying direction does not interfere both the ends in the conveying direction of the outside link assembly 21C or the inside link assembly 22C.

On the other hand, as shown in FIG. 1(*a*), two rectangular recesses 21*d* are formed at upstream and downstream edges in the conveying direction of the tongue piece 21*b*.

At a central portion of the tongue piece 21*b*, a notched hole 21*e* is formed.

Inside the receiving member 3, upper and lower portions of the receiving member 3 are connected to each other so as to be pinched vertically by two first solid parts 3*a* with which inner edges of the recesses 21*d* are filled.

Accordingly, both edges in a direction perpendicular to the conveying direction (extended direction of the tongue piece 21*b*) of each of the recesses 21*d* touches the corresponding first solid part 3*a* and serves as a stopper. Then, for example, even if sudden compression load or tension load is applied on the receiving member 3 perpendicularly to the conveying direction, the receiving member 3 is not removed from the tongue piece 21*b*.

Figure 2:
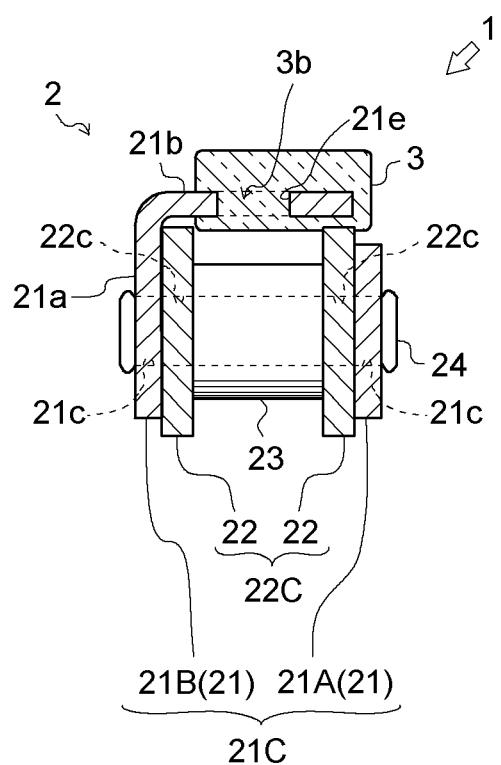
FIG. 2 is a sectional view of the entire configuration of the conveyor chain according to the first embodiment with respect to an arrow B of FIG. 1(b).
Figure 4:
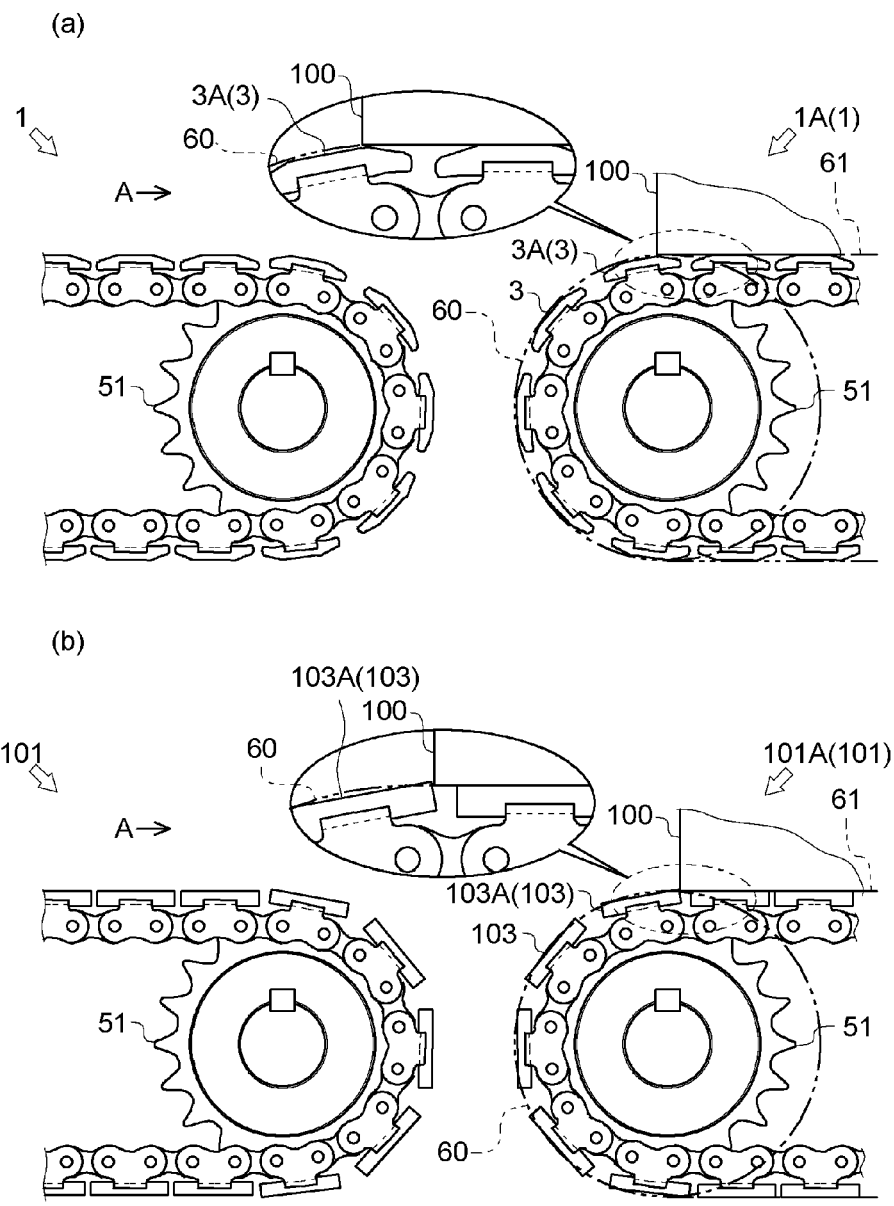
FIG. 4 is a drawing of a state in which a conveyance object is fully transferred to the downstream conveyor chain at a transfer part between the conveyor chains.
Figure 5:
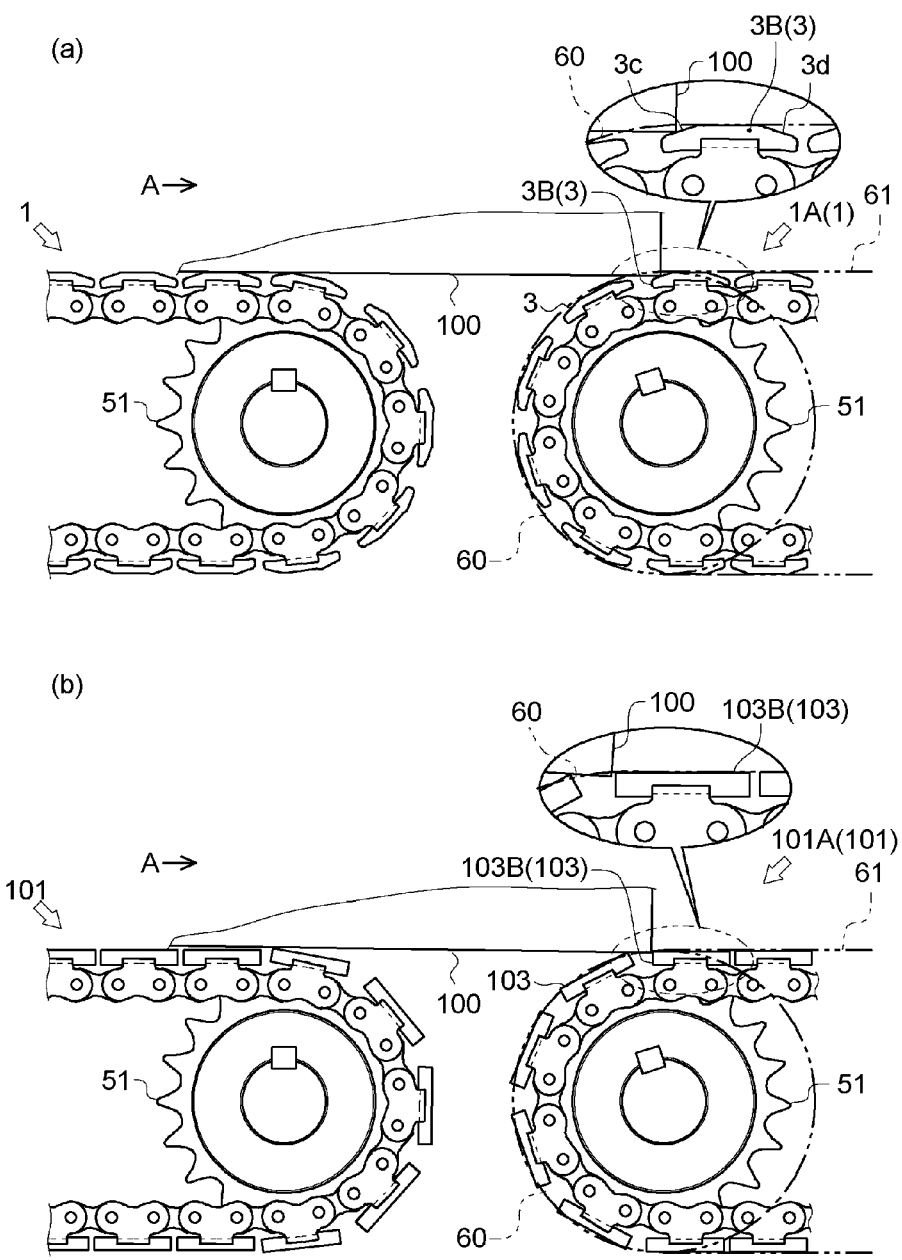
FIG. 5 is a drawing of a state in which the conveyance object is at a middle of transfer to the downstream conveyor chain at the transfer part between the conveyor chains.

As shown in FIG. 2, inside the receiving member 3, the upper and lower portions of the receiving member 3 are connected to each other by a second solid part 3*b* with which an inner peripheral part (a space surrounded by an inner peripheral surface; the same shall apply hereinafter) of the notched hole 21*e*.

Accordingly, the inner peripheral surface of the notched hole 21*e* touches the second solid part 3*b* and serves as a stopper. Then, similarly to the recesses 21*d*, for example, when sudden compression load or tension load is applied on the receiving member 3 perpendicularly to the conveying direction, the receiving member 3 is not removed from the tongue piece 21*b*.

As mentioned above, in the conveyor chain 1 of the first embodiment, the receiving member 3 is fixed to the second outside link plate 21B via the tongue piece 21b in which the recesses 21d (see FIG. 1(a)) and the notched hole 21e are formed.

As a method for forming the receiving member 3, firstly, the tongue piece 21b is inserted into a cavity of a mold (not shown), and subsequently, a material is poured into the cavity, and then heating treatment is performed. Namely, the receiving member 3 is formed integrally with the tongue piece 21b, and as shown in FIG. 1(a), each of two corners 21f of an extended end of the tongue piece 21b is processed into a circular arc shape.

Therefore, in this embodiment, when the receiving member 3 is formed, the material poured into the cavity can flow easily along the circular arcs of the corners 21f, whereby the material can be spread fully in the cavity so as to improve a yield of the material.

As shown in FIG. 1(b), in each of sides in the extended direction (conveying direction) of the upper surface of the receiving member 3 which is a mounting surface, a tapered surface is formed which reduces the thickness of the receiving member 3 gradually along the extended direction.

Concretely, in the upper surface of the receiving member 3, in an upstream portion in the conveying direction, the tapered surface (hereinafter, referred to as "upstream tapered surface 3c") is formed which is slanted gradually downward toward the upstream side, and in a downstream portion in the conveying direction, the tapered surface (hereinafter, referred to as "downstream tapered surface 3d") is formed which is slanted gradually downward toward the downstream side.

As shown in FIG. 3(a), by providing the upstream tapered surface 3c and the downstream tapered surface 3d, a locus of the upper surface of the receiving member 3 at upstream or downstream end in the conveying direction of the conveyor chain 1 at the time at which the conveyor chain 1 is meshed with and wound onto the sprocket 51 is within an imaginary circle 60 arranged coaxially to the sprocket 51.

The circle 60 is specified so that a tangent of the circle 60 is a straight locus 61 of the upper surface of the receiving member 3 at the time of conveying the bucket 100.

According to the construction, by the conveyor chain 1 of this embodiment, the bucket 100 can be conveyed to a predetermined position while both the bucket 100 and the receiving member 3 are not damaged by "biting" or "hooking" at the upstream or downstream end in the conveying direction.

Concretely, as shown in FIG. 3(b), in a conventional conveyor chain 101, a plurality of rectangular receiving members 103 are disposed above an outside link assembly 121C while a lengthwise direction of each of the receiving members 103 is along the conveying direction and an upper surface of the receiving member 103 is horizontal.

Accordingly, at the time at which the conveyor chain 101 is wound onto the sprocket 51 at upstream or downstream end in the conveying direction of the conveyor chain 101, upstream and downstream ends in the conveying direction of the receiving members 103 pulsate in a radial direction of the sprocket 51, whereby a locus of the receiving members 103 protrudes from the imaginary circle 60 arranged coaxially to the sprocket 51.

As a result, as shown in FIG. 4(b), at a transfer part between the two conventional conveyor chains 101 for example, the receiving member 103 just before released from the state wound onto the sprocket 51 (in FIG. 4(b), referred to as "receiving member 103A) intrudes to the bucket 100 after fully transferred to the conveyor chain 101 at a downstream side (hereinafter, referred to as "downstream conveyor chain 101A"), whereby the "biting" or "hooking" may be caused between a lower surface of the upper surface in the conveying direction of the bucket 100 and an end surface of a downstream side in the conveying direction of an upper surface of the receiving member 103.

To the contrary, as shown in FIG. 4(a), at a transfer part between the two conveyor chains 1 of this embodiment, even if the receiving member 3 just before released from the state wound onto the sprocket 51 (in FIG. 4(a), referred to as "receiving member 3A) intrudes to the bucket 100 after fully transferred to the conveyor chain 1 at a downstream side in the conveying direction (hereinafter, referred to as "downstream conveyor chain 1A"), the locus of the upper surface of the receiving member 3 is within the circle 60, whereby "biting" or "hooking" is not caused between the lower surface of the upper surface in the conveying direction of the bucket 100 and the end surface of the downstream side in the conveying direction of an upper surface of the receiving member 3.

As shown in FIG. 5(b), at the transfer part between the two conventional conveyor chains 101 for example, a lower end at a downstream side in the conveying direction of the bucket 100 just before reaching the downstream conveyor chain 101A may fall downward a little by unbalanced load.

Then, when the bucket 100 at such the state is drawn out further to the downstream conveyor chain 101A and conveyed, "biting" or "hooking" may be caused between the lower surface of the upstream side in the conveying direction of the bucket 100 and an end surface of a upstream side in the conveying direction of the upper surface of the receiving member 103 (more concretely, the receiving member 103B just after released from the state wound onto the sprocket 51).

To the contrary, as shown in FIG. 5(a), at the transfer part between the two conveyor chains 1 of this embodiment, even if the lower end at the downstream side in the conveying direction of the bucket 100 just before reaching the downstream conveyor chain 1A falls downward a little by unbalanced load and the bucket 100 at such the state is drawn out to the downstream conveyor chain 1A and conveyed, the lower end at the downstream side in the conveying direction can climb over the receiving member 3 relatively while sliding on the upstream tapered surface 3c of the receiving member 3 (more concretely, the receiving member 3B just after released from the state wound onto the sprocket 51).

Therefore, the "biting" or "hooking" is not caused between the lower surface of the downstream side in the conveying direction of the bucket 100 and an end surface of an upstream side in the conveying direction of the upper surface of the receiving member 3.

Furthermore, as shown in FIG. 6(b), for example, when a stopper 52 is disposed in the conventional conveyor chain 101 and the bucket 100 at a middle of the conveying is made strike the stopper 52 and is stopped, "slack" may be caused in the conveyor chain 101 in an area between the sprocket 51 at the upstream in the conveying direction and the bucket 100 by influence of torque of the sprocket 51, friction generated on the upper surfaces of the plurality of the receiving member 103 on which the bucket 100 is mounted, and the like.

As a result, the conveyor chain 101 is bent slightly upward in the area in which the "slack" is caused. At such the state, when the conveyor chain 101 is moved further to the conveying direction, the "biting" or "hooking" may be caused between the lower surface of the downstream side in the conveying direction of the bucket 100 and the end surface of the upstream side in the conveying direction of the upper surface of the receiving member 103.

To the contrary, as shown in FIG. 6(a), when the stopper 52 is disposed in the conveyor chains 1 of this embodiment and the bucket 100 at a middle of the conveying is made strike the stopper 52 and is stopped, the "slack" is caused in the conveyor chain 1 in an area between the sprocket 51 at the upstream in the conveying direction and the bucket 100.

As a result, the conveyor chain 1 is bent slightly upward in the area in which the "slack" is caused. However, at such the state, even if the conveyor chain 1 is moved further to the conveying direction, a lower end of the upstream side in the conveying direction of the bucket 100 can climb over the receiving member 3 relatively while sliding on the downstream tapered surface 3d of the receiving member 3.

Therefore, the "biting" or "hooking" is not caused between the lower surface of the upstream side in the conveying direction of the bucket 100 and an end surface of a downstream side in the conveying direction of the upper surface of the receiving member 3.

[Conveyor Chain 201 (Second Embodiment)]

Next, an explanation will be given on a conveyor chain 201 according to a second embodiment which realizes the present invention referring to FIGS. 7 to 9.

Figure 7:
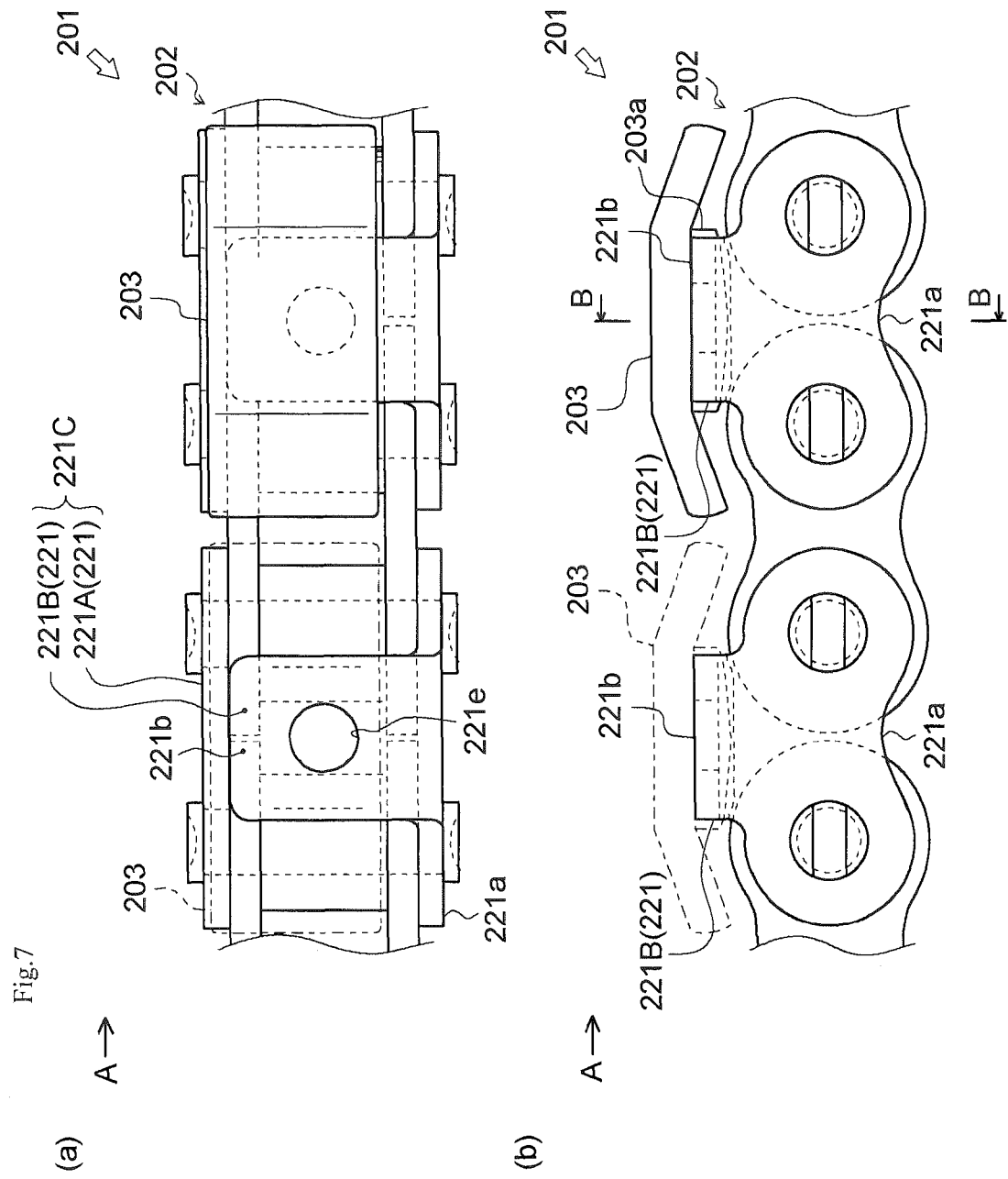
FIG. 7 is a drawing of entire configuration of a conveyor chain according to a second embodiment of the present invention.
Figure 8:
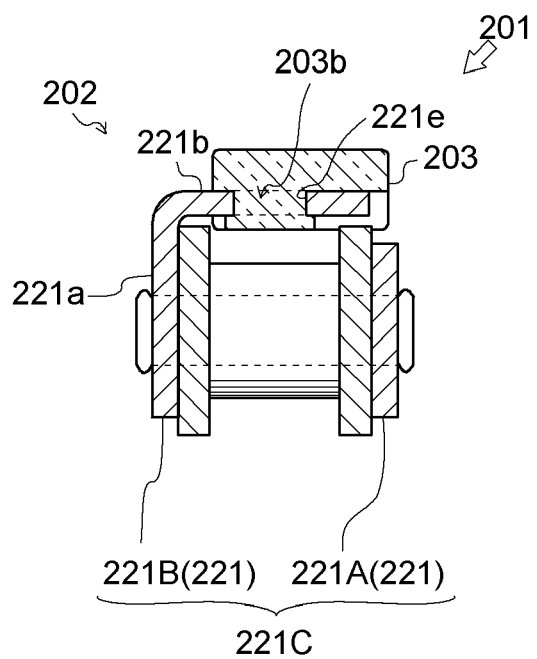
FIG. 8 is a sectional view of the entire configuration of the conveyor chain according to the second embodiment with respect to an arrow B of FIG. 7(b).
Figure 9:
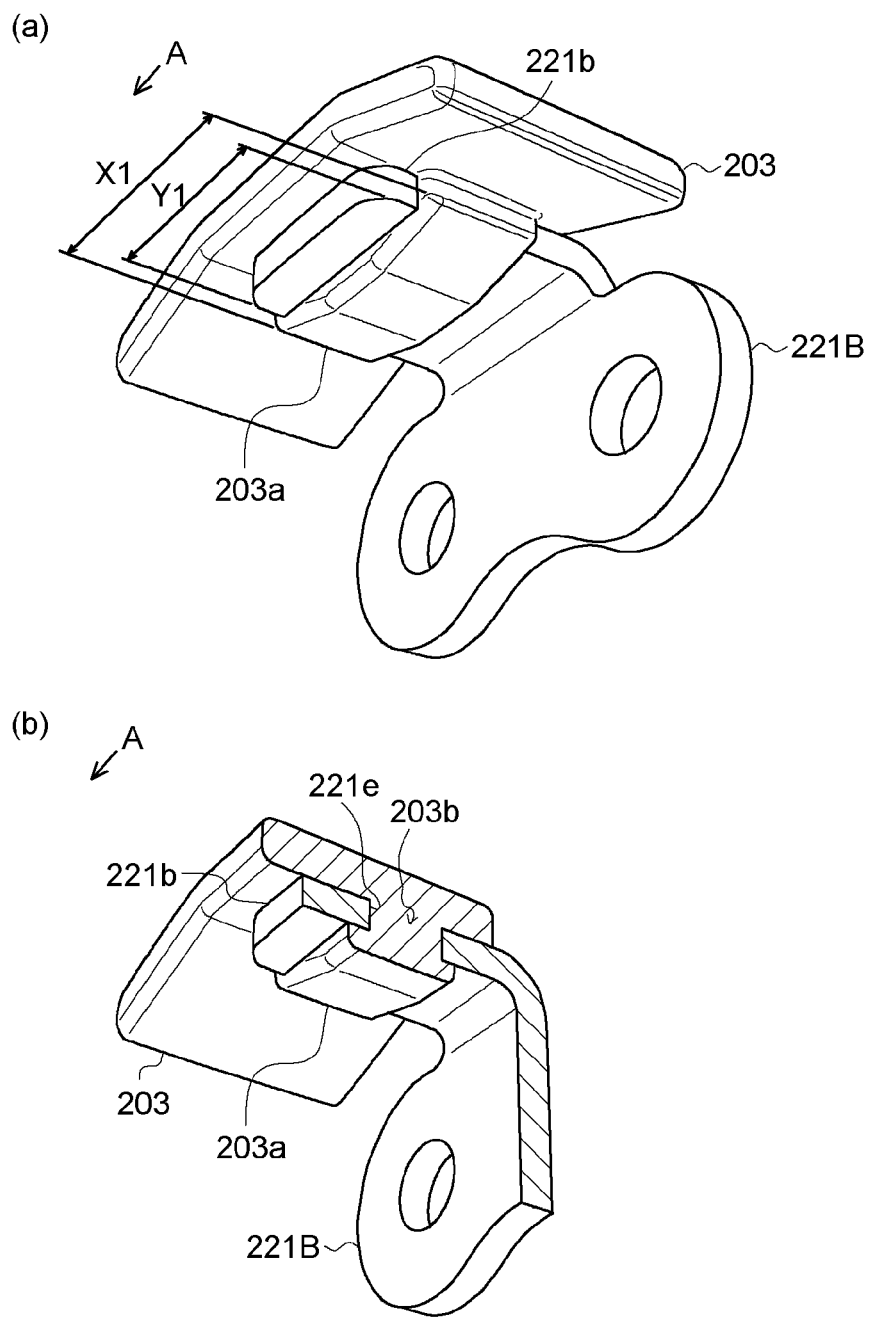
FIG. 9 is a drawing of a shape of a chain link equipped with a receiving member in the conveyor chain according to the second embodiment.

In below explanation, for convenience, a vertical direction of each of FIGS. 7(b), 8 and 9 is specified as a vertical direction of the conveyor chain 201.

A direction of an arrow A in each of FIGS. 7 and 9 is specified as the conveying direction.

The conveyor chain 201 of the second embodiment has substantially the same configuration as the conveyor chain 1 of the first embodiment and is different from the conveyor chain 1 concerning configuration of a second outside link plate 221B and a receiving member 203.

Then, in below explanation, the difference from the conveyor chain 1 (the first embodiment) is mainly described and the configuration the same as the conveyor chain 1 is not described.

As shown in FIG. 7(a), the conveyor chain 201 mainly includes a chain body 202 and the plurality of the receiving members 203.

The chain body 202 mainly includes a plurality of outside link plates 221.

Each of the outside link plates 221 includes a first outside link plate 221A or the second outside link plate 221B.

The first outside link plate 221A includes a plate member which has a substantially rectangular shape with round corners and is extended along the conveying direction (the direction of the arrow A; the same shall apply hereinafter), and for example in this embodiment, the first outside link plate 221A is extended horizontally and is in parallel to a vertical plane.

On the other hand, the second outside link plate 221B includes a base 221a and a tongue piece 221b.

The base 221a is extended along the conveying direction and shaped substantially the same as the first outside link plate 221A. The tongue piece 221b is shaped rectangular and extended perpendicularly to the base 221a at an edge at one of sides of a direction perpendicular to the extended direction of the base 221a (in this embodiment, an upper edge).

As discussed later, the receiving member 203 is fixed to the second outside link plate 221B via the tongue piece 221b.

The second outside link plate 221B is disposed so that the base 221a faces the first outside link plate 221A in a direction perpendicular to the conveying direction (that is, the horizontal direction) and the tongue piece 221b is extended toward the first outside link plate 221A.

Accordingly, the first outside link plate 221A and the second outside link plate 221B, which are disposed oppositely to each other, constitute the pair of the outside link plates 221 (hereinafter, referred to as "outside link assembly 221C" as needed).

The receiving member 203 includes a substantially rectangular plate member formed by thermoplastic resin or an elastic member such as rubber, for example.

Then, the receiving member 203 is disposed so that an extended direction of the receiving member 203 is in agreement with the conveying direction and a thickness direction of the receiving member 203 is perpendicular to a facing direction of the first outside link plate 221A and the second outside link plate 221B.

Namely, the receiving member 203 is disposed in an upper portion of the outside link assembly 221C so that a lengthwise direction of the receiving member 203 is in agreement with the conveying direction and an upper surface of the receiving member 203 is horizontal.

As shown in FIG. 7(b), at a middle portion in the thickness direction of the receiving member 203, the tongue piece 221b is fitted.

Concretely, at a central portion of a lower surface of the receiving member 203, a rectangular projection 203a extended along the conveying direction is formed. A lengthwise dimension of the projection 203a (dimension X1 in FIG. 9(a)) is set larger than a width dimension of the tongue piece 221b (dimension Y1 in FIG. 9(a)) (X1>Y1).

As shown in FIG. 9(a), at one of sides in a direction perpendicular to the conveying direction (more concretely, at a side of the second outside link plate 221B), the tongue piece 221b is fitted to the projection 203a. The receiving member 203 is formed so as to pinch the tongue piece 221b vertically and is fixed to the tongue piece 221b strongly.

Accordingly, as shown in FIG. 9(b), an upstream side, a downstream side and a lower surface in the conveying direction of the tongue piece 221b are covered by the projection 203a. For example, even if sudden compression load or tension load is applied on the receiving member 203 to the conveying direction or upward, a position of the receiving member 203 concerning the tongue piece 221b is not shifted and is not turned over concerning the tongue piece 221b.

On the other hand, as shown in FIG. 7(a), at a central portion of the tongue piece 221b, a notched hole 221e is formed.

As shown in FIG. 8, inside the receiving member 203, an upper portion and a lower portion (more concretely, the projection 203a) of the receiving member 203 are connected to each other by a solid part 203b with which an inner edge of the notched hole 221e is filled.

Accordingly, an inner peripheral surface of the notched hole 221e touches the solid part 203b and serves as a stopper. Then, for example, even if sudden compression load or tension load is applied on the receiving member 203 perpendicularly to the conveying direction, the receiving member 203 is not removed from the tongue piece 221b.

As mentioned above, in the conveyor chain 201 of the second embodiment, the receiving member 203 is fixed to the second outside link plate 221B via the tongue piece 221b in which the notched hole 221e is formed.

As shown in FIG. 7(a), unlike the tongue piece 21b of the first embodiment, in the tongue piece 221b of the conveyor chain 201 of this embodiment, the rectangular recesses 21d are not formed at upstream and downstream edges in the conveying direction.

Accordingly, number of processes of the tongue piece 221b of the conveyor chain 201 is reduced from that of the conveyor chain 1 of the first embodiment, whereby a cost can be reduced.

In the conveyor chain 201, the projection 203a is formed at the central portion of the lower surface of the receiving member 203, and the tongue piece 221b is fitted via the projection 203a.

Accordingly, in the conveyor chain 201, a material of the receiving member 203 can be reduced in comparison with the case that the thickness of the receiving member 3 is generally set large previously like as the conveyor chain 1 of the first embodiment, whereby the cost can be reduced.

[Conveyor Chain 301 (Third Embodiment)]

Next, an explanation will be given on a conveyor chain 301 according to a third embodiment which realizes the present invention referring to FIGS. 10 to 12.

In below explanation, for convenience, a vertical direction of each of FIGS. 10(*b*), 11 and 12 is specified as a vertical direction of the conveyor chain 301.

Figure 10:
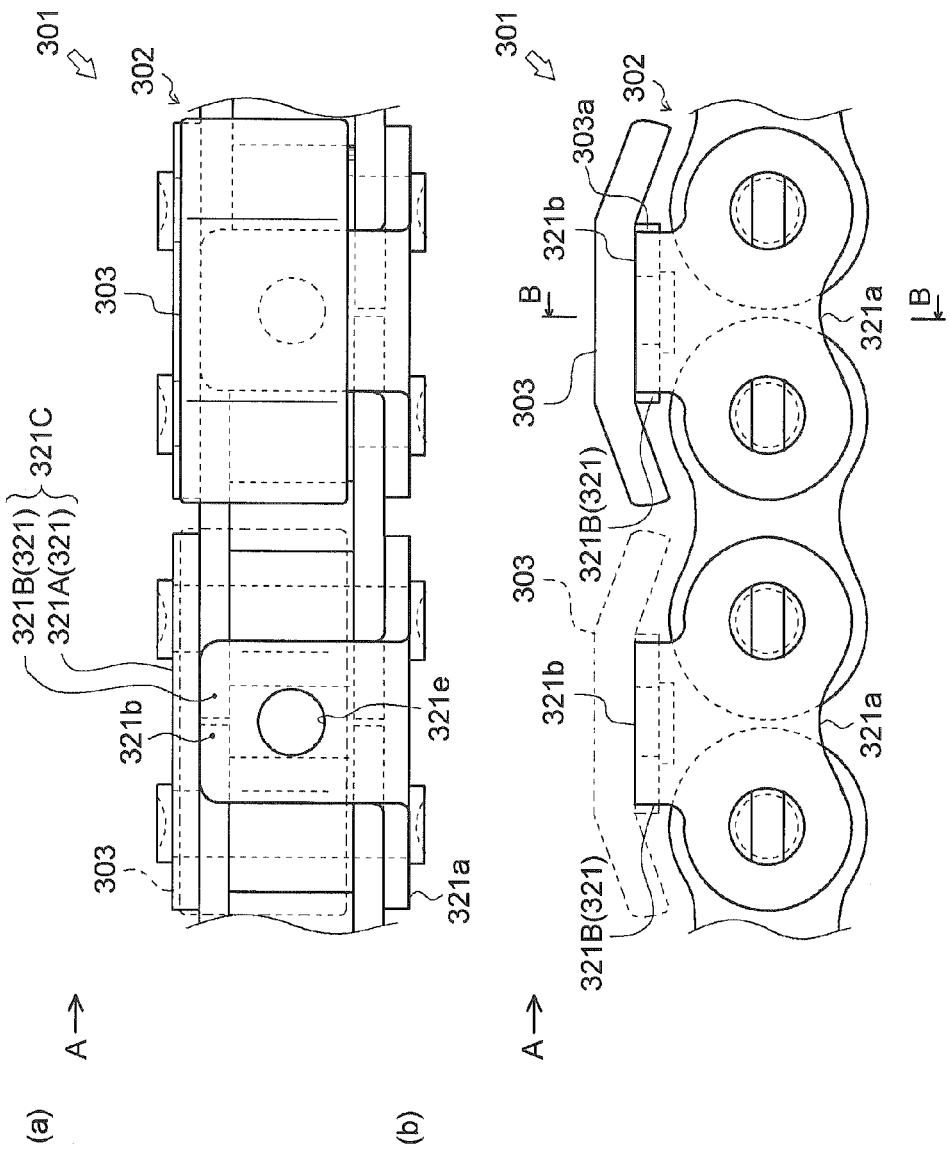
FIG. 10 is a drawing of entire configuration of a conveyor chain according to a third embodiment of the present invention.
Figure 12:
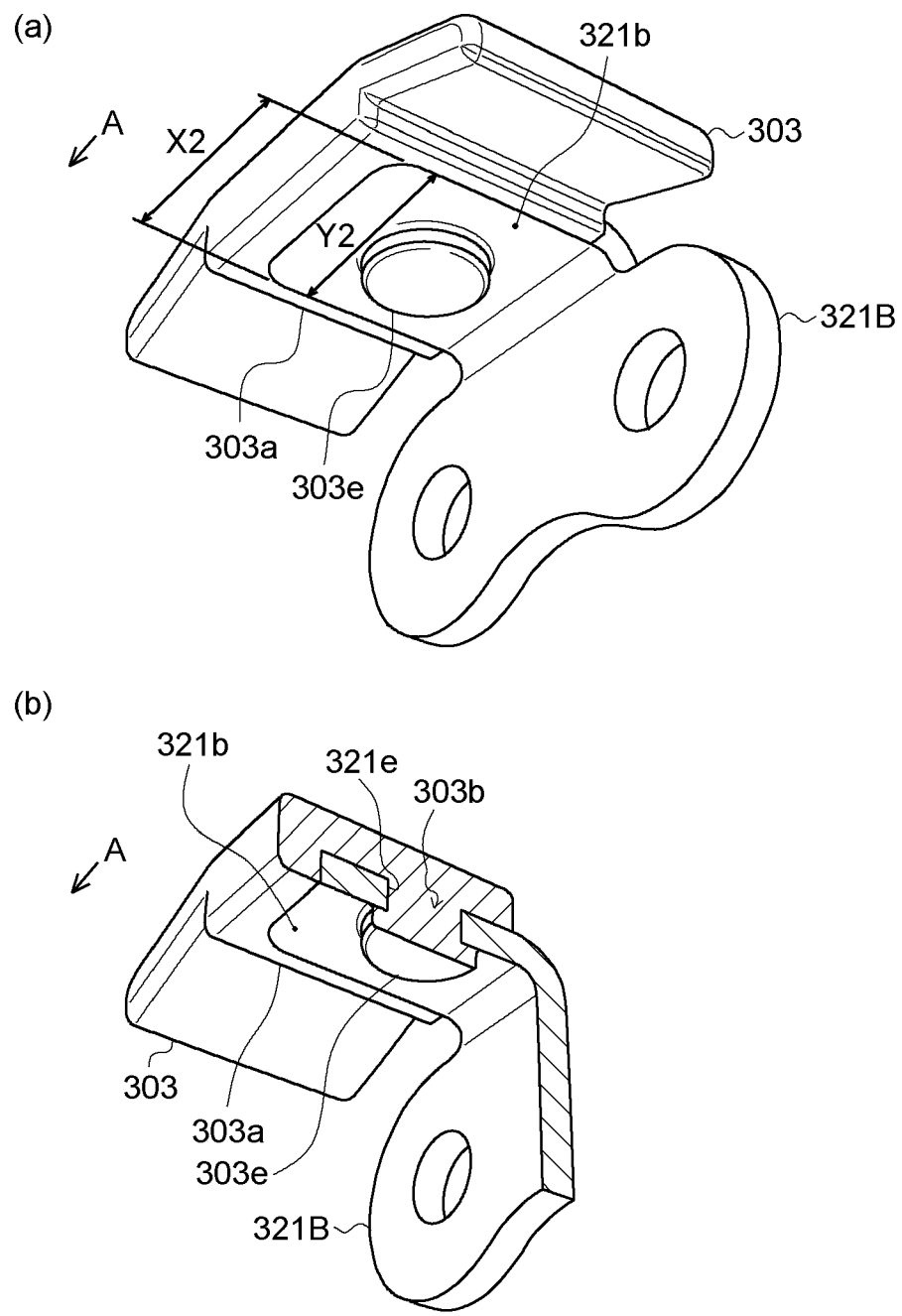
FIG. 12 is a drawing of a shape of a chain link equipped with the receiving member in a conveyor chain according to the third embodiment.

A direction of an arrow A in each of FIGS. 10 and 12 is specified as the conveying direction.

The conveyor chain 301 of the third embodiment has substantially the same configuration as the conveyor chain 1 of the first embodiment and is different from the conveyor chain 1 concerning configuration of a second outside link plate 321B and a receiving member 303.

Then, in below explanation, the difference from the conveyor chain 1 (the first embodiment) is mainly described and the configuration the same as the conveyor chain 1 is not described.

As shown in FIG. 10(*a*), the conveyor chain 301 mainly includes a chain body 302 and the plurality of the receiving members 303.

The chain body 302 mainly includes a plurality of outside link plates 321.

Each of the outside link plates 321 includes a first outside link plate 321A or the second outside link plate 321B.

The first outside link plate 321A includes a plate member which has a substantially rectangular shape with round corners and is extended along the conveying direction (the direction of the arrow A; the same shall apply hereinafter), and for example in this embodiment, the first outside link plate 321A is extended horizontally and is in parallel to a vertical plane.

On the other hand, the second outside link plate 321B includes a base 321a and a tongue piece 321b.

The base 321a is extended along the conveying direction and shaped substantially the same as the first outside link plate 321A. The tongue piece 321b is shaped rectangular and extended perpendicularly to the base 321a at an edge at one of sides of a direction perpendicular to the extended direction of the base 321a (in this embodiment, an upper edge).

As discussed later, the receiving member 303 is fixed to the second outside link plate 321B via the tongue piece 321b.

The second outside link plate 321B is disposed so that the base 321a faces the first outside link plate 321A in a direction perpendicular to the conveying direction (that is, the horizontal direction) and the tongue piece 321b is extended toward the first outside link plate 321A.

Accordingly, the first outside link plate 321A and the second outside link plate 321B, which are disposed oppositely to each other, constitute the pair of the outside link plates 321 (hereinafter, referred to as "outside link assembly 321C" as needed).

The receiving member 303 includes a substantially rectangular plate member formed by thermoplastic resin or an elastic member such as rubber, for example.

Then, the receiving member 303 is disposed so that an extended direction of the receiving member 303 is in agreement with the conveying direction and a thickness direction of the receiving member 303 is perpendicular to a facing direction of the first outside link plate 321A and the second outside link plate 321B.

Namely, the receiving member 303 is disposed in an upper portion of the outside link assembly 321C so that a thickness direction of the receiving member 303 is in agreement with the conveying direction and an upper surface of the receiving member 303 is horizontal.

As shown in FIG. 10(*b*), at a middle portion in the thickness direction of the receiving member 303, the tongue piece 321b is fitted.

Concretely, as shown in FIG. 12(*a*), at a central portion of a lower surface of the receiving member 303, a projection 303a which is U-like shaped in a bottom view is formed so as to be opened toward one of sides in a direction perpendicular to the conveying direction (more concretely, at a side of the second outside link plate 321B).

An inner dimension of an inner edge of the projection 303a along the conveying direction (dimension X2 in FIG. 12(*a*)) is set substantially the same as a width dimension of the tongue piece 321b (dimension Y2 in FIG. 12(*a*)) (X2=Y2).

A thickness dimension of the projection 303a (more concretely, a vertical depth dimension of the inner edge of the projection 303a) is set substantially the same as a thickness dimension of the tongue piece 321b.

The tongue piece 321b is fitted to the inner edge of the projection 303a, and the receiving member 303 is formed integrally with the tongue piece 321b and fixed strongly to the tongue piece 321b.

Accordingly, an upstream side and a downstream side in the conveying direction and a side of the extended direction (more concretely, a side opposite to the second outside link plate 321B) of the tongue piece 321b are covered by the projection 303a. For example, even if sudden compression load or tension load is applied on the receiving member 303 to the conveying direction, a position of the receiving member 303 concerning the tongue piece 321b is not shifted.

On the other hand, as shown in FIG. 10(*a*), at a central portion of the tongue piece 321b, a notched hole 321e is formed.

Figure 11:
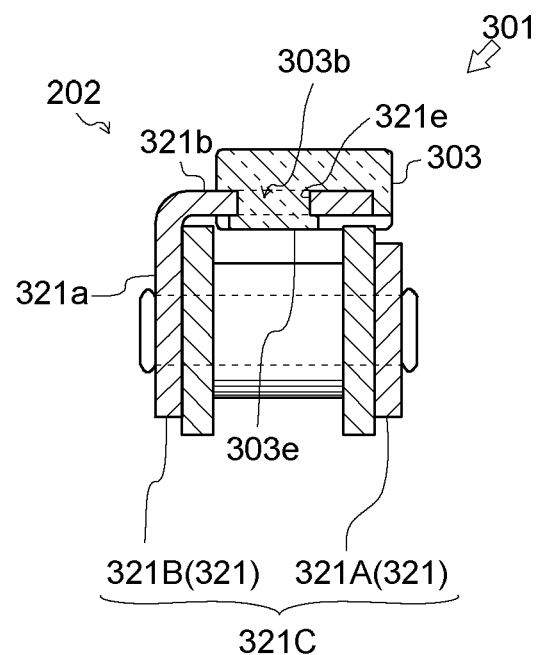
FIG. 11 is a sectional view of the entire configuration of the conveyor chain according to the third embodiment with respect to an arrow B of FIG. 10(b).

As shown in FIG. 11, inside the receiving member 303, an upper portion of the receiving member 303 is connected by a solid part 303b with which an inner edge of the notched hole 321e is filled, and a lower end of the solid part 303b is connected to an enlarged diameter part 303e coaxial to the solid part 303b.

Accordingly, as shown in FIG. 12(*b*), an inner peripheral surface of the notched hole 321e touches the solid part 303b and serves as a stopper. Then, for example, even if sudden compression load or tension load is applied on the receiving member 303 perpendicularly to the conveying direction, the receiving member 303 is not removed from the tongue piece 321b.

An edge of an upper surface of the enlarged diameter part 303e touches a lower edge of the notched hole 321e. Then, for example, even if sudden compression load or tension load is applied on the receiving member 303 upward, the receiving member 303 is not turned over concerning the tongue piece 321b.

As mentioned above, in the conveyor chain 301 of the third embodiment, the receiving member 303 is fixed to the second outside link plate 321B via the tongue piece 321b in which the notched hole 321e is formed.

As shown in FIG. 10(*a*), unlike the tongue piece 21b of the first embodiment, in the tongue piece 321b of the conveyor chain 301 of this embodiment, the rectangular recesses 21d are not formed at upstream and downstream edges in the conveying direction.

Accordingly, number of processes of the tongue piece 321b of the conveyor chain 301 is reduced from that of the conveyor chain 1 of the first embodiment, whereby the cost can be reduced.

In the conveyor chain 301, the projection 303a is formed at the central portion of the lower surface of the receiving member 303, and the tongue piece 321b is fitted via the projection 303a. The enlarged diameter part 303e is formed at the lower end of the solid part 303b with which the inner edge of the notched hole 321e of the tongue piece 321b is filled.

Accordingly, in the conveyor chain 301, a material of the receiving member 303 can be reduced in comparison with the case that the thickness of the receiving member 3 is generally set large previously like as the conveyor chain 1 of the first embodiment, whereby the cost can be reduced.

[Receiving Member 403 (503) (Another Embodiment)]

Next, an explanation will be given on configuration of a receiving member 403 (503) according to another embodiment referring to FIG. 13.

In below explanation, for convenience, a vertical direction of FIG. 13 is specified as a vertical direction of the receiving member 403 (503).

A direction of an arrow A in FIG. 13 is specified as the conveying direction.

The receiving member 403 (503) of another embodiment has substantially the same configuration as the receiving member 3 of the conveyor chain 1 according to the first embodiment and is different from the receiving member 3 concerning shape of a lower surface at an upstream side and a downstream side in the conveying direction.

Then, in below explanation, the difference from the receiving member 3 is mainly described and parts having the same shapes as the receiving member 3 are not described.

As shown in FIG. 13(a), for example, a central portion in the conveying direction (the direction of the arrow A) of the receiving member 403 has enough thickness for fitting the tongue piece 21b of the second outside link plate 21B of the first embodiment (see FIG. 1(b)).

On the other hand, each of the upstream and downstream sides in the conveying direction of the receiving member 403 has a thickness enough thinner than the central portion in the conveying direction.

At each of the upstream and downstream sides in the conveying direction of the lower surface of the receiving member 403, a flat rib member 403a is formed so as to be extended along the conveying direction and be in parallel to the vertical plane.

The number of the rib members is not limited. For example, as shown in FIG. 13(b), two or more (in FIG. 13(b), two) rib members 503a may alternatively be formed in parallel to each other at each of upstream and downstream sides in the conveying direction of the lower surface of the receiving member 503.

Arrangement of the plurality of the rib members is not limited to the arrangement in that the rib members are in parallel to each other as shown in this embodiment, and another arrangement such as lattice-like arrangement may alternatively be used.

According to the receiving member 403 (503) having such the configuration, a material can be reduced in comparison with the receiving member 3 of the conveyor chain 1 according to the first embodiment while maintaining rigidity against sudden compression load or tension load applied on the upstream and downstream sides in the conveying direction of the receiving member 403 (503), whereby the cost can be reduced.

Description of Notations 1 conveyor chain
3 receiving member
3c upstream tapered surface
3d downstream tapered surface
21A first outside link plate (first link plate)
21B second outside link plate (second link plate)
21b tongue piece
51 sprocket
60 circle
61 locus
100 bucket (article to be carried)

The invention claimed is:

1. A conveyor chain conveying a conveyance object by power transmitted via a sprocket meshed with the conveyor chain, comprising:
a first link plate extended along a conveying direction;
a second link plate extended along the conveying direction and facing the first link plate in a direction perpendicular to the conveying direction; and
a receiving member which is formed substantially rectangular, whose extended direction is in agreement with the conveying direction, and whose thickness direction is perpendicular to the facing direction of the first link plate and the second link plate,
wherein a tongue piece, which is extended perpendicular to the second link plate and toward the first link plate, is provided at one of edges in a direction perpendicular to the extended direction of the second link plate,
wherein the receiving member is formed integrally with and fixed to the second link plate via the tongue piece, and
wherein the conveyance object is conveyed while being mounted on the receiving member,
wherein a tapered surface, which reduces the thickness of the receiving member gradually along the extended direction, is formed at each of sides in the extended direction of a mounting surface of the receiving member, and
a locus of sides of the mounting surface in the extended direction in a case in which the conveyor chain is meshed with and wound onto the sprocket is within an imaginary circle arranged coaxially to the sprocket, and
the circle is specified so that a tangent of the circle is a straight locus of the mounting surface at a time of conveying the conveyance object.

2. The conveyor chain according to claim 1,
wherein the tongue piece is fit at a middle portion in the thickness direction of the receiving member,
wherein a notched hole is formed at a central portion of the tongue piece, and
wherein inside the receiving member, thick parts at both sides in the thickness direction of the receiving member are connected to each other by a solid part with which an inside of the notched hole is filled.

3. The conveyor chain according to claim 2,
wherein a rectangular recess is formed at each of edges in a direction perpendicular to the extended direction of the tongue piece, and
wherein inside the receiving member, the thick parts at both sides in the thickness direction of the receiving member are connected to each other by a solid part with which an inside of the recess is filled.

* * * * *